No. 895,673. PATENTED AUG. 11, 1908.
F. D'OR.
TURNING MECHANISM FOR BRIDGES.
APPLICATION FILED JAN. 6, 1908.

Witnesses.
S. Newman
H. O. Penney

Inventor:
Florimond d'Or,
By his Attorney, F. H. Richards

UNITED STATES PATENT OFFICE.

FLORIMOND D'OR, OF ST.-JOSSE-TEN-NOODE, BRUSSELS, BELGIUM.

TURNING MECHANISM FOR BRIDGES.

No. 895,673.　　　　Specification of Letters Patent.　　　Patented Aug. 11, 1908.

Application filed January 6, 1908. Serial No. 409,427.

*To all whom it may concern:*

Be it known that I, FLORIMOND D'OR, a subject of the Kingdom of Belgium, residing in St.-Josse-ten-Noode, Brussels, in Belgium, have invented certain new and useful Improvements in Turning Mechanism for Bridges; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to a mechanism for turning bridges, actuated by a fluid under pressure. The bridge is supported on a pivot moving vertically under the influence of this fluid and is driven by means of a stud with which it is provided, this stud moving in a helicoidal groove formed in the fixed support for the pivot.

Figure 1:
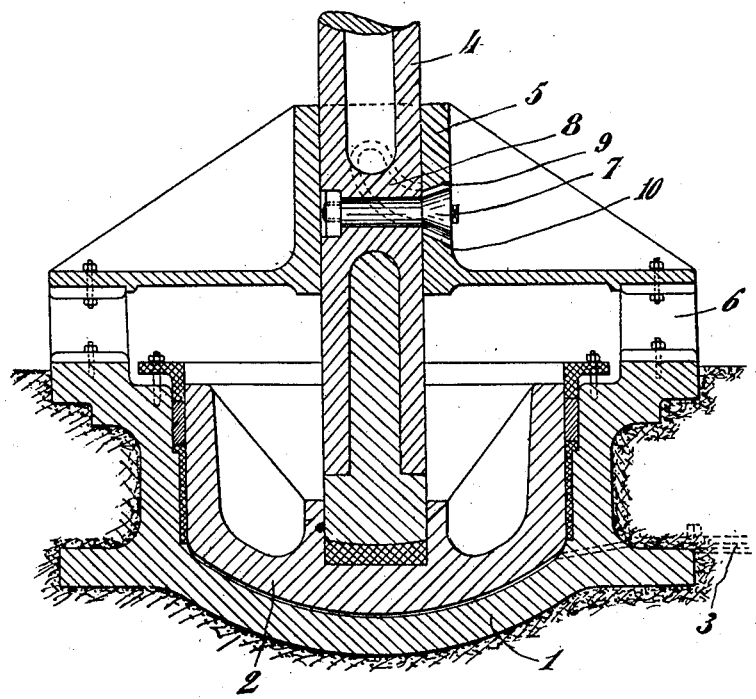
Figure 2:
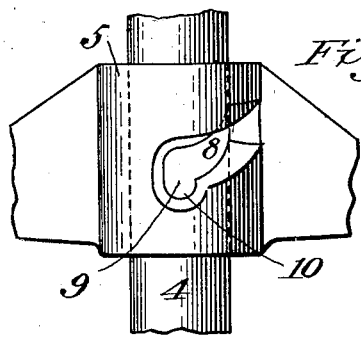

In the accompanying drawing representing one embodiment of my invention, Figure 1 is a vertical section of the device and Fig. 2 shows in elevation a detail of the helicoidal groove.

A piston 2 moves in a cylinder 1 under the influence of a fluid such as water or air under pressure which is supplied through a pipe 3. Upon this piston there rests the lower extremity of a pivot 4 fixed to the turning bridge (this bridge is not represented in the drawing). The vertical displacement of this pivot 4 is provided for by a collar 5 connected by stays 6 with the cylinder 1. A stud 7 is fixed to the pivot 4 and moves in a groove 8 formed in the collar 5. This groove is of helical form, its lower part ending in a small vertical portion 9. The bridge resting upon these supports, if the fluid under pressure is introduced into the cylinder 1, the piston 2 rises, carrying with it the pivot 4. At the beginning of this stroke of the pivot 4 the stud 7 is displaced in the vertical part 9 of the groove 8 and the bridge rises without turning in such a manner as to release it from its fixed supports, but as the pivot continues to rise the stud is displaced in the helicoidal portion of the groove 8 so that a movement of rotation is imparted to the pivot and consequently to the bridge. The extent of the helicoidal portion of the groove 8 is necessarily proportionate to the angle through which it is desired to rotate the bridge. When the pressure beneath the piston is cut off the reverse action takes place and the bridge is returned to its closed position.

In order that the weight of the bridge may rest upon the piston by the intermediary of the pivot 4 during the closing operation and not upon the collar 5 by the intermediary of the bolt 7, it is advantageous to prolong the vertical portion of the groove downwards, as represented at 10.

It should be noted that in case of accident to the piston 2 or to the mechanism for distributing the fluid under pressure, it is only necessary to release the bridge from the support 4 and to cause it to rotate on this support (which has become fixed) by any convenient means.

It will of course be understood that instead of fixing the stud to the pivot and providing a groove in the collar, the stud might equally well be fixed to the collar and the groove formed in the pivot.

Having now particularly described and ascertained the nature of my said invention and in what manner the same is to be performed, I declare that what I claim is:—

1. In a device of the character described, the combination of a frame having a vertical socket, a pivot member rotatable in the socket, one of said members having a helicoidal groove containing a vertical portion at the lower end, the other of said members carrying a pin operating in said groove to rotate the pivot when it is moved vertically in the socket.

2. In a device of the character described, the combination of a frame member having a vertical socket, and a pivot member rotatable in said socket, the socket member having a helicoidal groove having a vertical extension at its lower end, and a pin in the pivot member having its head engaging the walls of said groove.

3. In a device of the character described, the combination of a frame member having a vertical socket, and a pivot member rotatable in said socket, the socket member having a helicoidal groove having a vertical extension at its lower end, and a pin in the pivot member having its head engaging the walls of said groove, the frame member being provided with a cylinder at its lower part, and a piston in said cylinder secured to the pivot member to elevate the pivot.

In testimony that I claim the foregoing as my invention, I have signed my name in presence of two subscribing witnesses.

FLORIMOND D'OR.

Witnesses:
    HENRI RACLOT,
    LUCIEN CROCHET.